United States Patent
Lee et al.

(10) Patent No.: US 11,551,415 B2
(45) Date of Patent: Jan. 10, 2023

(54) METHOD AND APPARATUS FOR REGENERATION AND PREDICTION OF TREE MAP

(71) Applicant: Samsung Electronics Co., Ltd., Suwon-si (KR)

(72) Inventors: Soonyoung Lee, Suwon-si (KR); Yoonsung Park, Suwon-si (KR); Junghwan Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 23 days.

(21) Appl. No.: 17/123,811

(22) Filed: Dec. 16, 2020

(65) Prior Publication Data

US 2021/0183142 A1 Jun. 17, 2021

(30) Foreign Application Priority Data

Dec. 16, 2019 (KR) .................. 10-2019-0167644

(51) Int. Cl.
*G06T 17/05* (2011.01)
*G06T 7/90* (2017.01)
*G06T 7/10* (2017.01)

(52) U.S. Cl.
CPC .............. *G06T 17/05* (2013.01); *G06T 7/10* (2017.01); *G06T 7/90* (2017.01)

(58) Field of Classification Search
CPC ............. G06T 17/05; G06T 7/10; G06T 7/90
See application file for complete search history.

(56) References Cited

U.S. PATENT DOCUMENTS

| | | | |
|---|---|---|---|
| 8,352,410 B2 | 1/2013 | Rousselle et al. | |
| 9,885,789 B2 | 2/2018 | Pighin et al. | |
| 10,365,804 B1* | 7/2019 | Limaye | G06F 3/04842 |
| 10,820,213 B2 | 10/2020 | Park et al. | |
| 10,977,748 B2* | 4/2021 | Bostick | G06Q 50/01 |
| 2010/0158312 A1* | 6/2010 | Wu | G06V 20/54 |
| | | | 382/103 |

(Continued)

FOREIGN PATENT DOCUMENTS

| | | |
|---|---|---|
| CN | 109937543 A | 6/2019 |
| JP | 3776591 B2 | 5/2006 |

(Continued)

OTHER PUBLICATIONS

International Search Report dated Apr. 16, 2021, issued in International Patent Application No. PCT/KR2020/018465.

*Primary Examiner* — Yi Yang
(74) *Attorney, Agent, or Firm* — Jefferson IP Law, LLP

(57) ABSTRACT

A pre-5$^{th}$-Generation (5G) or 5G communication system for supporting higher data rates Beyond 4$^{th}$-Generation (4G) communication system such as long term evolution (LTE) is provided. The method for operating a server includes receiving a first image including at least one tree, determining whether to generate a tree map based on the first image, based on a difference between first tree region data of the first image and second tree region data of a second image which is prestored, and generating the tree map according to determining.

12 Claims, 21 Drawing Sheets

(56) References Cited

U.S. PATENT DOCUMENTS

| | | | | |
|---|---|---|---|---|
| 2016/0180171 A1* | 6/2016 | Kamata | ................ | G05D 1/0274 |
| | | | | 382/103 |
| 2016/0292905 A1 | 10/2016 | Nehmadi et al. | | |
| 2017/0200293 A1* | 7/2017 | Solem | .................... | H04N 7/185 |
| 2018/0139623 A1* | 5/2018 | Park | ................... | H04B 17/3913 |
| 2019/0286932 A1* | 9/2019 | Du | ........................ | G06V 10/50 |

FOREIGN PATENT DOCUMENTS

| | | |
|---|---|---|
| JP | 2010-128565 A | 6/2010 |
| JP | 5269729 B2 | 8/2013 |
| JP | 5949484 B2 | 7/2016 |
| JP | 2019-003606 A | 1/2019 |
| WO | 2018/093204 A1 | 5/2018 |

\* cited by examiner

METHOD AND APPARATUS FOR REGENERATION AND PREDICTION OF TREE MAP

CROSS-REFERENCE TO RELATED APPLICATION(S)

This application is based on and claims priority under 35 U.S.C. § 119(a) of a Korean patent application number 10-2019-0167644, filed on Dec. 16, 2019, in the Korean Intellectual Property Office, the disclosure of which is incorporated by reference herein in its entirety.

BACKGROUND

1. Field

The disclosure relates to a method and an apparatus for regeneration and prediction of a tree map. More particularly, the disclosure relates to a method and an apparatus for managing a tree map using an image and predicting a future tree map.

2. Description of the Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid (frequency shift keying) FSK and quadrature amplitude modulation (QAM) frequency quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

An environment for deploying a base station is considered, in designing the 5G system. A signal propagation environment may differ according to a distribution of various obstacles such as buildings or trees. Herein, the tree changes its size and shape depending on a season and the time of year. Accordingly, discussions are conducted on a technique for acquiring the signal propagation environment by determining positions or shapes of the trees. To determine the tree shape, the discussed technique observes the trees per time using a plurality of detection data sets having collection time differences. By observing the trees per period, the discussed technique may estimate a growth rate of the trees and predict the tree shapes in future.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for determining whether to regenerate a tree map using an image.

Another aspect of the disclosure is to provide an apparatus and a method for continuously managing or regenerating a tree map which changes based on time.

Another aspect of the disclosure is to provide an apparatus and a method for regenerating a tree map if determining to regenerate the tree map in a communication system.

Another aspect of the disclosure is to provide an apparatus and a method for storing a tree map and predicting a future tree map based on the stored tree maps in a communication system.

Another aspect of the disclosure is to provide an apparatus and a method for enabling a more accurate propagation simulation by analyzing an effect of tree density or size change on a propagation element based on time.

Additional aspects will be set forth in part in the description which follows and, in part, will be apparent from the description, or may be learned by practice of the presented embodiments.

In accordance with an aspect of the disclosure, a method for operating a server is provided. The method includes receiving a first image including at least one tree, determining whether to generate a tree map based on the first image, based on a difference between first tree region data of the first image and second tree region data of a second image which is prestored, and generating the tree map according to determining.

According to various embodiments of the disclosure, a method for operating a server may include determining whether to predict a tree map, and generating the tree map based on first tree region data of a first image prestored, and second tree region data of a second image prestored.

In accordance with another aspect of the disclosure, a server is provided. The server includes a transceiver and at least one processor functionally coupled to the transceiver, wherein the at least one processor is configured to receive a first image including at least one tree, determine whether to generate a tree map based on the first image, based on a difference between first tree region data of the first image and second tree region data of a second image which is prestored, and generate the tree map according to determining.

According to various embodiments of the disclosure, a server may include a transceiver and at least one processor functionally coupled to the transceiver, wherein the at least one processor is configured to determine whether to predict a tree map, and generate the tree map based on first tree region data of a first image prestored, and second tree region data of a second image prestored.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

Figure 1:
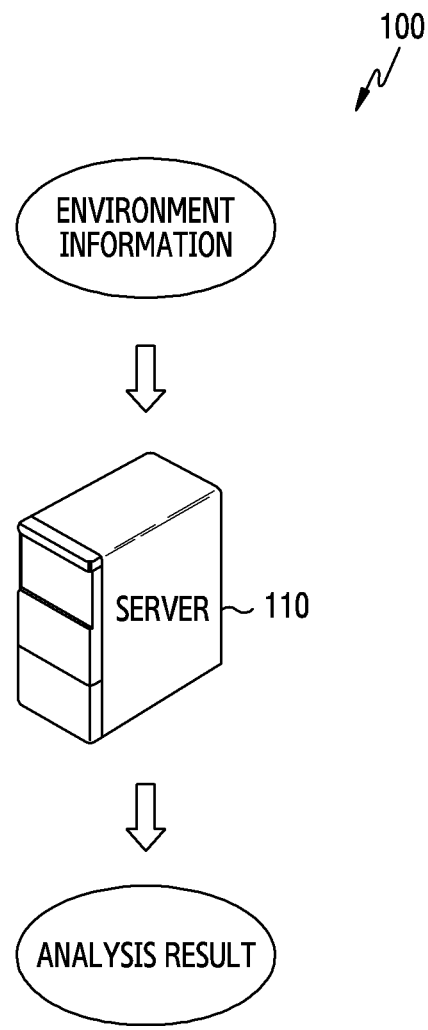
FIG. 1 illustrates a communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on a hardware-based approach. However, various embodiments of the disclosure include a technology which uses both hardware and software and thus, the various embodiments of the disclosure may not exclude the perspective of software.

Hereinafter, the disclosure provides a method and an apparatus for managing and predicting a tree map in a communication system. Specifically, the disclosure describes a technology for providing information of a tree which changes based on time, in the form of a map in a wireless communication system.

Terms indicating signals, terms indicating channels, terms indicating control information, terms indicating network entities, and terms indicating components of a device are mentioned for convenience of descriptions. Accordingly, the disclosure is not limited to the following terms and other terms having the same technical meaning may be used.

Further, the expression "larger than" or "smaller than" is used to determine whether a specific condition is satisfied or fulfilled, but is only to indicate an example and does not exclude "larger than or equal to" or "equal to or smaller than" A condition indication "larger than or equal to" may be replaced with a condition indicating "larger than", a condition indicating "equal to or smaller than" may be replaced with "smaller than", and a condition indicating "larger than or equal to and smaller than" may be replaced with "larger than and smaller than".

In the following, the image is illustrated as an image observed at a satellite, but the image may indicate any visual image, including the image observed at the satellite, including trees, such as an image measured on a street. Hence, the image is not limited to the image observed at the satellite.

FIG. 1 illustrates a communication system according to an embodiment of the disclosure.

Referring to FIG. 1, a system 100 includes a server 110, as an entity for analyzing propagation characteristics. The server 110 may be configured by installing a program for analyzing the propagation characteristics on a general-purpose computing device, or may be designed only for a corresponding function. For example, the server 110 may be implemented with a single computing device or a cloud system.

The server 110 analyzes propagation characteristics of signals in the wireless communication system. For example, the server 110 may acquire estimation data such as a signal transfer path or a signal attenuation level. The server 110 may estimate a signal quality per region, identify a shadow area, or determine serviceability at a particular location, based on the estimate data, and thus generate secondary assessment information such as a signal quality per region, a shadow area location, and serviceability per location. In addition, based on the assessment information, the server 110 may further generate recommendation information such as the number of necessary antennas for the service, required transmit parameters (e.g., power, angle, etc.), and antenna deployment location. According to another embodiment, the secondary information and the recommendation information may be generated by other entity than the server 110.

To analyze the propagation characteristics, environment information may be provided to the server 110. The environment information may be inputted to the server 110 offline, or may be received from other device via a wired or wireless network. The environment information may include information of topography, buildings, roads, facilities, or trees, region information for performing a propagation characteristics simulation.

If analyzing the propagation characteristics based on the environment information, the server 110 may output a propagation analysis result. Herein, the outputted propagation analysis result may indicate at least one of measurement data, the secondary information, and the recommendation information. The output may be made in various forms. For example, the propagation analysis result may be provided to a user through a visual or auditory means (e.g., a monitor, a printer, a speaker, etc.) recognizable by a person.

Figure 2:
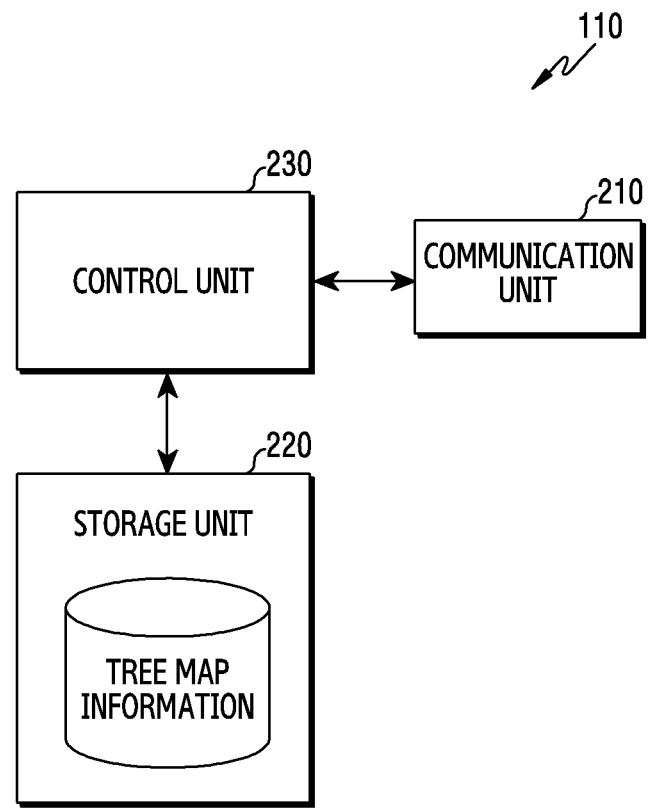
FIG. 2 illustrates a configuration of a server in a communication system according to an embodiment of the disclosure.

FIG. 2 illustrates a configuration of a server in a wireless communication system according to an embodiment of the disclosure.

The configuration illustrated in FIG. 2 may be understood as the configuration of the server 110. A term such as 'portion' or '~ er' used hereafter indicates a unit for processing at least one function or operation, and may be implemented using hardware, software, or a combination of hardware and software.

Referring to FIG. 2, the server includes a communication unit 210, a storage unit 220, and a control unit 230.

The communication unit 210 provides an interface for communicating with other entities in the network. That is, the communication unit 210 converts a bit string transmitted from the server to other entity, for example, a base station, a core network, or an authentication server, to a physical signal, and converts a physical signal received from other entity, to a bit string. That is, the communication unit 210 may transmit and receive signals. Hence, the communication unit 210 may be referred to as a modem, a transmitter, a receiver or a transceiver.

The storage unit 220 stores a basic program for operating the server, an application program, and data such as setting information. Particularly, the storage unit 220 may store tree information, as necessary information for conducting a simulation on a subscriber device (e.g., a terminal). The storage unit 220 provides the stored data at a request of the control unit 230. According to various embodiments, the storage unit 220 may store the tree information. Also, the storage unit 220 may store a tree map per vintage according to a specific time. For example, the storage unit 220 may store data according to operations of the server according to various embodiments, to be explained.

The control unit 230 controls general operations of the server. For example, the control unit 230 transmits and receives signals through the communication unit 210. Also, the control unit 230 records and reads data in and from the storage unit 220. For doing so, the control unit 230 may include at least one processor.

According to various embodiments, the control unit 230 may control to receive location information of trees, to follow a condition criterion established by the user or to determine a time or a location arbitrarily set by the user, and to determine whether to regenerate the tree map. The control unit 230 may predict tree map information of a particular time after a present time according to the condition set by the user. For example, the control unit 230 may control the server to carry out operations according to various embodiments to be explained.

Figure 3:
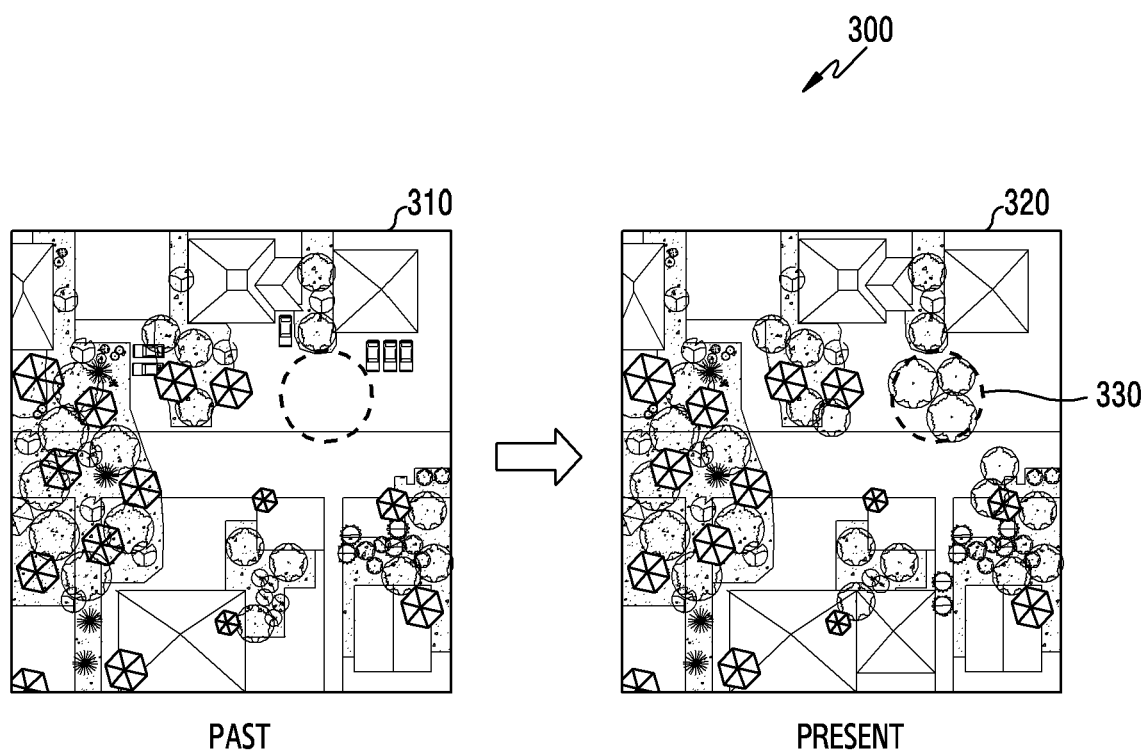
FIG. 3 illustrates images of a tree map which changes based on time, in a system according to an embodiment of the disclosure.

FIG. 3 illustrates images of a tree map which changes based on time, in a system according to an embodiment of the disclosure.

Referring to FIG. 3, in an image 300, a region occupied by trees changes in size based on time in the whole image. The left image of FIG. 3 shows a past tree image 310, and the right image of FIG. 3 shows a present tree image 320. The present tree image 320 includes a satellite image 330 of particular trees at the present.

In the tree image acquired at a satellite, the tree region may differ according to its measurement time.

Referring to FIG. 3, the satellite image 330 of the particular trees in the present may be greater than the past tree image 310, in the tree region area in the whole image. A surrounding propagation environment changes based on time, and accordingly an environment map recorded before may fall behind an actual current environment map.

The past in FIG. 3 indicates an arbitrary time before the present, and the present indicates an arbitrary time after the tree map regeneration or the past of the past tree image 310. The tree map, which have not changed before, may change in the present.

Figure 4:
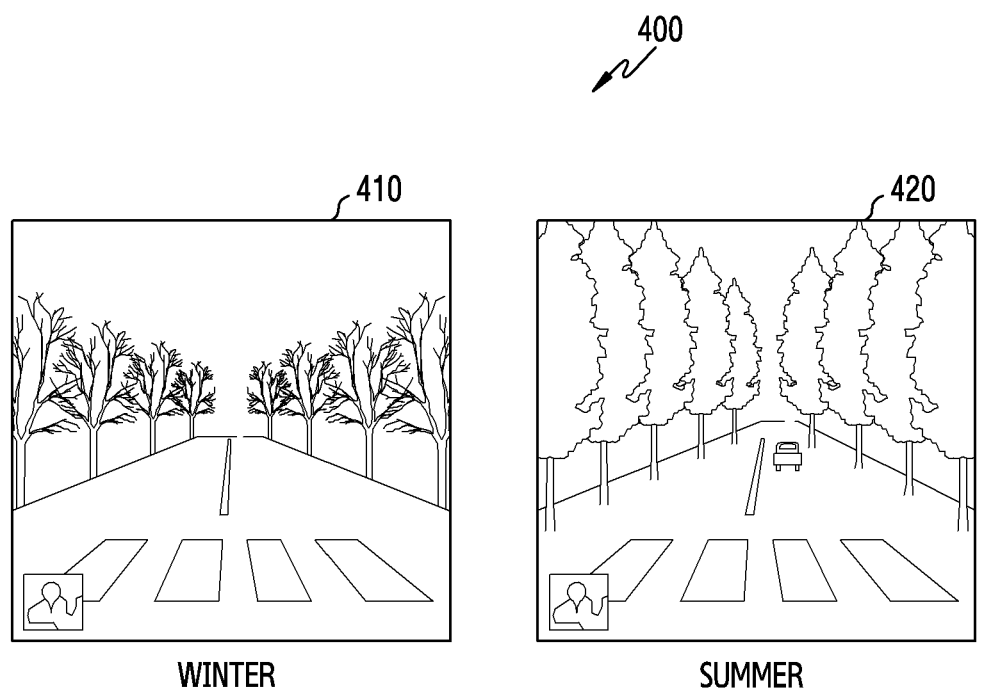
FIG. 4 illustrates images of a tree map which changes based on a seasonal change, in a system according to an embodiment of the disclosure.

FIG. 4 illustrates images of trees which change based on a seasonal change, in a system according to an embodiment of the disclosure.

The left image of FIG. 4 an image 400 indicates a winter tree image 410, and the right image of FIG. 4 indicates a summer tree image 420.

Referring to FIG. 4, the tree image acquired based on the time from winter to summer may differ. Since winter leaves are less than summer leaves in amount, the winter tree image 410 occupies small leave regions on the image. By contrast, leaves in the summer tree image 420 occupies considerable regions in the image. Hence, the leaf occupation region is smaller in the winter tree image 410, than the summer tree image 420. That is, the signal propagation environment changes based on the time, and in response to the seasonal change, the existing environment map recorded may be different from the current environment map according to an embodiment of the disclosure.

Figure 5:
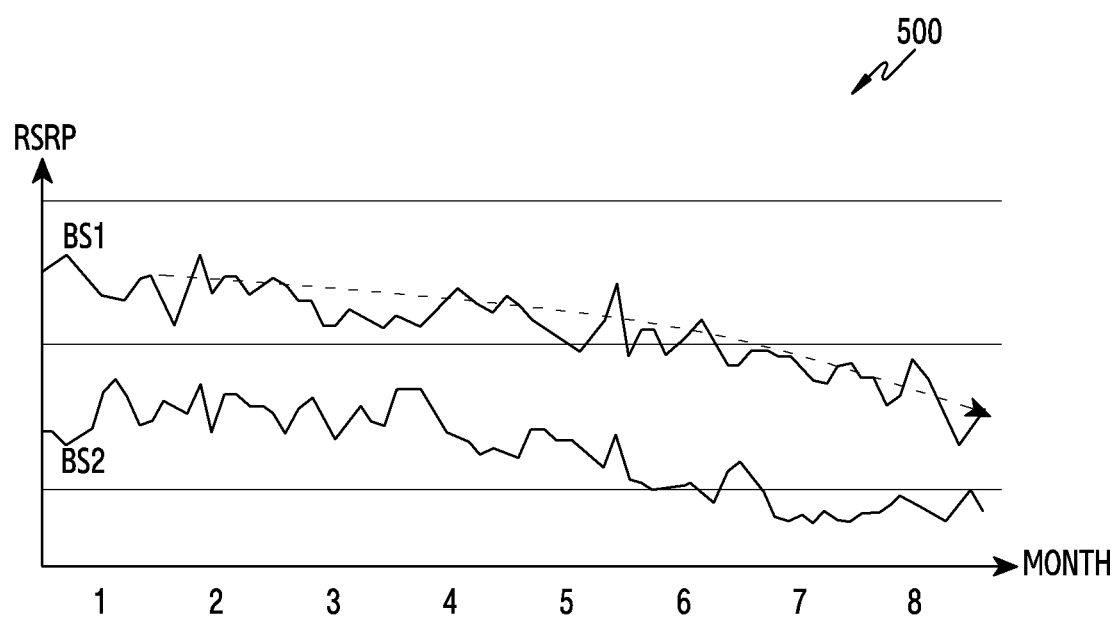
FIG. 5 illustrates a reference signal received power (RSRP) change graph based on time, in a system according to an embodiment of the disclosure.

FIG. 5 illustrates a reference signal received power (RSRP) change graph based on time, in a system according to an embodiment of the disclosure.

Referring to FIG. 5, an RSRP change graph 500 depicts changes of the RSRP indicating the signal strength at a terminal based on time, ranging from January to August. The graph of FIG. 5 shows the changes of the region occupied by the tress on the image in summer and winter, like the tree image changing according to the seasonal change in FIG. 4. January, corresponding to the winter, may correspond to the winter tree image 410 of FIG. 4, and August, corresponding to the summer, may correspond to the summer tree image 420 of FIG. 4. Since the tree leaves, which interfere with the propagation, are statistically less in winter than the summer tree, radio transmission and reception is less interfered in the winter than the summer Hence, the RSRP is greater in January than in August as shown in FIG. 5. Since the summer tree leaves are denser than the winter tree leaves, the radio transmission and reception in the summer is interfered more than the winter to produce the small RSRP. That is, the season changes from January to August with time, a size and a total amount of the leaves change according to the seasonal change, to affect the propagation environment. In average, the number of the leaves increases with time from January to August, and the RSRP decreases. In addition, FIG. 5 shows RSRP measurements with respect to a first base station (BS) and a second BS, based on time. The RSRP of the first BS is greater than that of the BS2 at the same time period, but the first BS and the second BS both exhibit the RSRP decrease according to the seasonal change.

Figure 6:
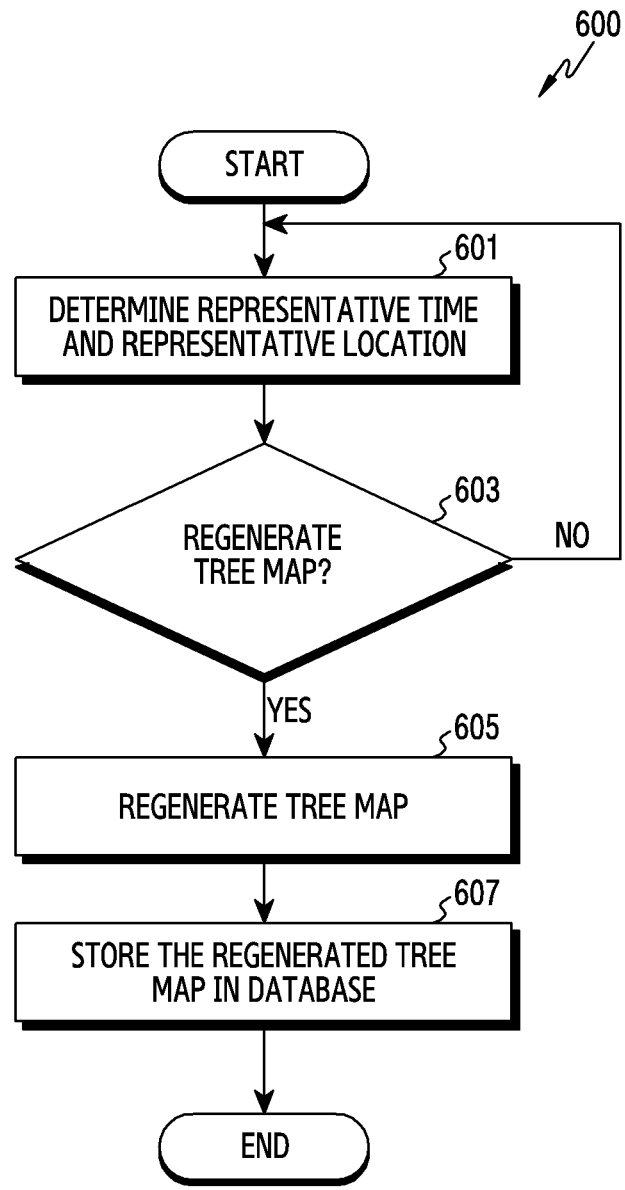
FIG. 6 illustrates a flowchart of a system for regenerating a tree map according to an embodiment of the disclosure.

FIG. 6 illustrates a flowchart of a system for regenerating a tree map according to an embodiment of the disclosure.

FIG. 6 illustrates an operating method of the server 110 for the tree map regeneration.

Referring to FIG. 6, in a method 600, in operation 601, the server determines a representative time and a representative location. The server determines the representative time and the representative location, to establish a criterion for the tree map regeneration. That is, based on the determined representative location, the server determines a tree region change represented as an image at the representative time.

In operation 603, the server determines whether to regenerate a tree map. At the representative time and the representative location, the server compares past tree region data with present tree region data. According to an embodiment, comparing may include acquiring an intersection over union (IOU) value using a color data difference or an area data difference and determining whether the IOU value exceeds a threshold.

In operation 605, the server regenerates the tree map. If determining to regenerate the tree map in operation 603, the server regenerates a new tree map. According to an embodiment, the server may update the existing image with a received image, in a grid including the received image of the existing tree map. According to an embodiment, the server may generate or change an image corresponding to the existing tree map, based on the received tree image. According to an embodiment, the server may change an image corresponding to the same location with the received tree image in a prestored tree map. The tree map regeneration may update data (e.g., size, shape, etc.) of the trees in the existing tree map.

In operation 607, the server stores the regenerated tree map in a database. That is, the server updates an image at the representative location of the server based on the regenerated tree map, and stores the existing tree map in its storage unit. According to an embodiment of the disclosure, the server may store the tree map per vintage. According to another embodiment, in parallel with or without storing the tree map, the server may transmit the existing tree map or the regenerated tree map to an external device. According to an embodiment, if the external device stores or manages the tree map, the server may receive tree map data from the external device.

The representative time in FIG. 6 may indicate a time according to the user's criterion or an arbitrary time set by the user. The representative location may indicate an arbitrary location set by the user. According to an embodiment of the disclosure, the representative location may indicate an arbitrary region determined based the user's criterion or an arbitrary region set by the user in an arbitrary area of a satellite image.

According to an embodiment, the color data difference may express a color value based on at least one of red green blue (RGB), hue saturation brightness (HSB) or cyan magenta yellow and black key (CMYK), and indicate a value indicative of its value change. The color data difference may embrace any method indicating the color value, including the RGB, the HSB, and the CMYK.

Figure 7:
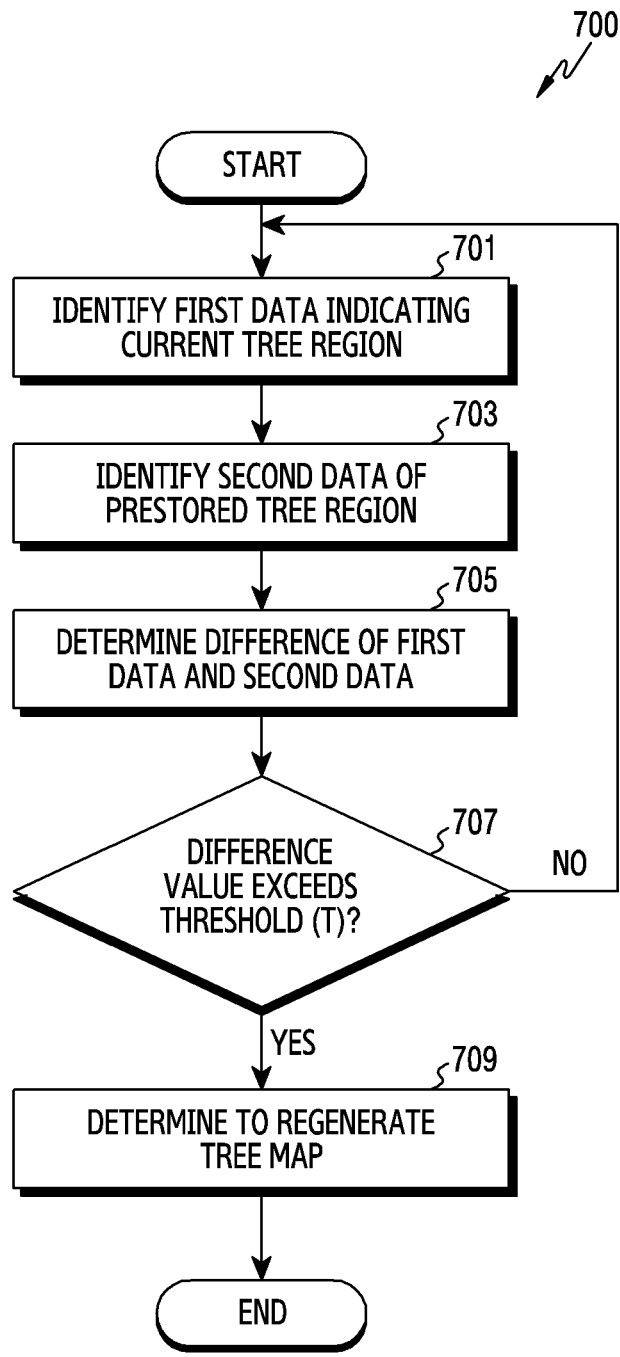
FIG. 7 illustrates a flowchart of a method for determining whether to regenerate a tree map in a system according to an embodiment of the disclosure.

FIG. 7 illustrates a flowchart of a method for determining whether to regenerate a tree map in a system according to an embodiment of the disclosure. FIG. 7 illustrates an operating method of the server.

Referring to FIG. 7, in a method 700, in operation 701, the server identifies first data indicating a current tree region. The first data indicates information of a region occupied by trees in a tree map indicating the current tree region. According to an embodiment of the disclosure, the first data may indicate color data of the tree region. According to an embodiment of the disclosure, the first data may indicate area data of the tree region.

In operation 703, the server identifies second data of a prestored tree region. The prestored tree region may indicate a past tree region on an image stored in the server. The second data indicates information of the region occupied by the trees on the past image, which is prestored. According to an embodiment of the disclosure, the second data may indicate color data of the tree region. According to an embodiment of the disclosure, the second data may indicate area data of the tree region. According to an embodiment of the disclosure, the sequence of operation 701 and operation 703 may change.

In operation 705, the server determines a difference value of the first data and the second data. The server calculates the difference of the first data and the second data, which are the tree occupation region information in the whole region. According to an embodiment, the difference value of the first data and the second data may indicate a difference of the data values indicating the tree color. According to an embodiment, the difference of the first data and the second data may indicate color data of the tree region. According to an embodiment of the disclosure, the first data may indicate the area data of the tree region.

In operation 707, the server determines whether the difference value exceeds a threshold T. That is, the server may determine whether the difference value of the first data and the second data exceeds the threshold. According to an embodiment, the threshold may indicate an arbitrary value set by the user. Alternatively, according to an embodiment, the threshold may be preset by a provider to optimize the propagation environment.

In operation 709, the server determines to regenerate the tree map. If identifying the difference value over the threshold in operation 707 and determining to regenerate the tree map, the server generates the tree map according to the current tree region image.

Figure 8:
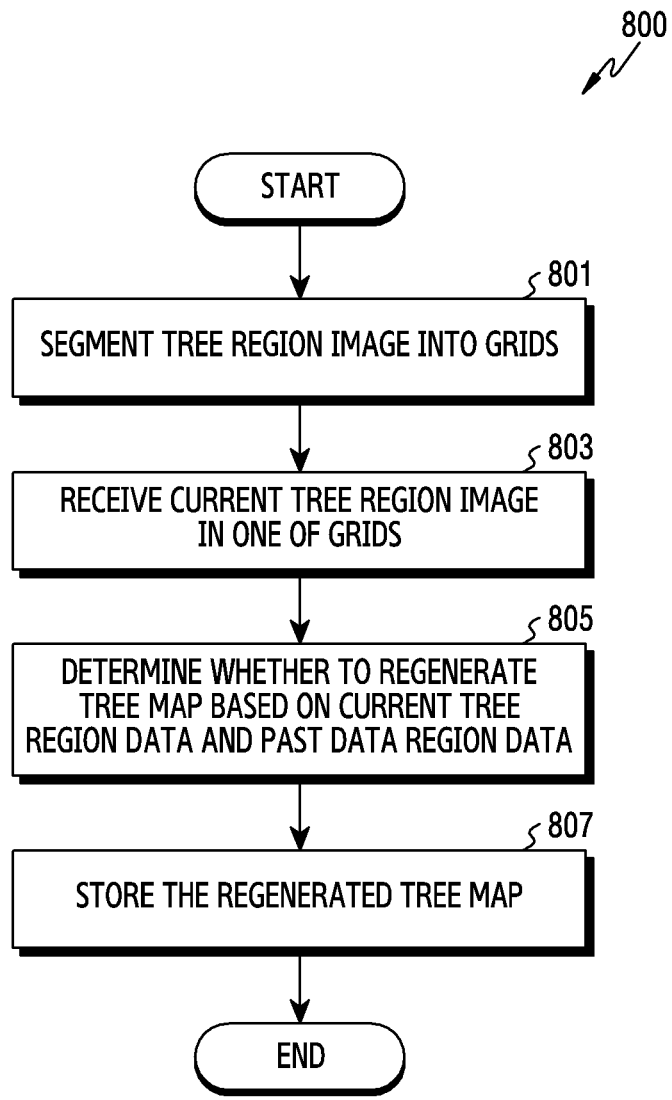
FIG. 8 illustrates a flowchart of a server for regenerating a tree map in a system according to an embodiment of the disclosure.

FIG. 8 illustrates a flowchart of a server for regenerating a tree map in a system according to an embodiment of the disclosure. FIG. 8 illustrates an operating method of the server 110.

Referring to FIG. 8, in a method 800, in operation 801, the server segments a tree region image into a plurality of grids. The server may identify the tree region image as a project boundary. According to an embodiment, the project boundary may indicate an arbitrary region set by the user, or a region according to a user's specific criterion. The project boundary may be divided into grids, and the project boundary and the grids according to an embodiment may be arbitrarily set by the user. To determine a target for determining a difference of a past tree region and a current tree region, the server segments the tree region image into at least one grid.

In operation 803, the server receives a current tree region image in one of the grids. The server segments a prestored tree map into the grids, and receives the current tree region image corresponding to the location corresponding to one of the segmented grids.

In operation 805, the server determines whether to regenerate the tree map, based on current tree region data and past data region data. The server compares the past tree region data and the current tree region. According to an embodiment, comparing the tree regions may include using a color data difference of a region occupied by trees in the tree image. The color data difference may digitize the color based on at least one of RGB, HSB or CMYK, and indicate a value indicative of its value change. According to an embodiment, comparing the tree regions may include using an area data difference of the region occupied by the trees in the tree image. According to an embodiment, comparing a past tree area and a current tree area may include using the IOU. Given two regions, the IOU indicates a value by dividing an intersection area of the two regions by the union, and indicates a value by dividing an intersection area of the current tree region and the past tree region by the union of the tree regions. The server may determine whether the difference exceeds a threshold, and determine to regenerate the tree map if the difference exceeds the threshold.

In operation 807, the server stores the regenerated tree map. According to an embodiment, if determining whether to regenerate the tree map based on the color data or the IOU in operation 805, the server regenerates the tree map to update the tree map. The regenerated tree map and the existing tree map may be stored in the storage unit 220 of the server. According to an embodiment of the disclosure, the server may store the tree map per vintage in the storage unit. According to another embodiment, in parallel with or without storing the tree map, the server may transmit the existing tree map or the regenerated tree map to an external device. According to an embodiment, if the external device stores or manages the tree map, the server may receive tree map data from the external device.

Figure 9:
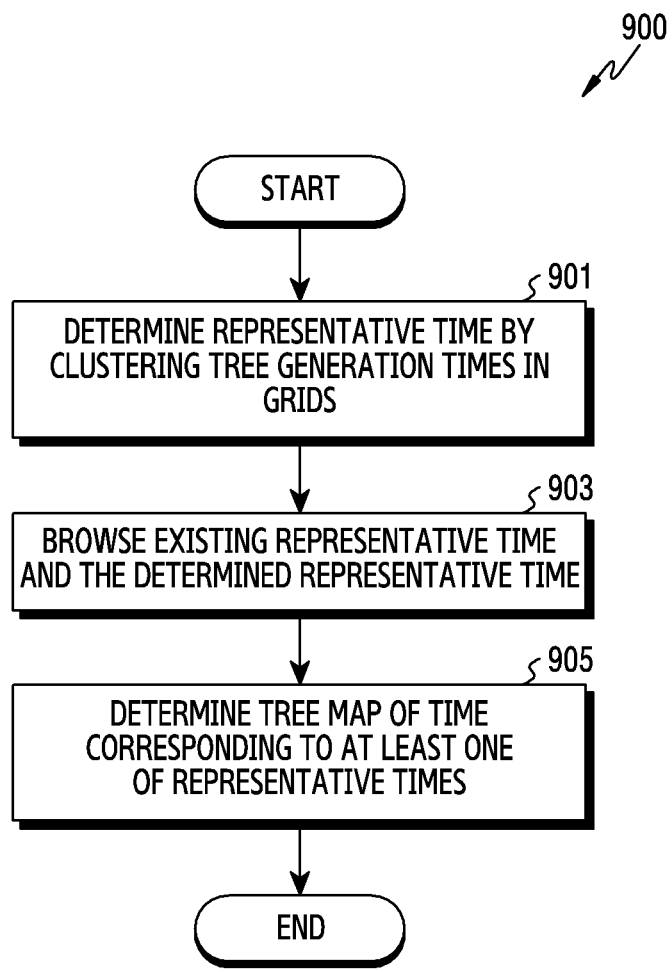
FIG. 9 illustrates a flowchart of a method for determining a representative time in grids, in a system according to an embodiment of the disclosure.

FIG. 9 illustrates a flowchart of a method for determining a representative time in grids, in a system according to an embodiment of the disclosure. FIG. 9 illustrates an operating method of the server 110.

Referring to FIG. 9, in a method 900, in operation 901, the server determines a representative time by clustering tree generation times in the grids. After the tree region image is segmented into a plurality of grids, the server determines the representative time based on the tree generation time per grid. According to an embodiment, determining the representative time may include determining the tree generation time according to a change level of the tree region of the grids in the project boundary, and determining the time of the greatest tree region change in the project boundary, to the representative time by considering the tree generation times.

In operation 903, the server browses an existing representative time and the determined representative time. The server determines a representative time previously determined, including the representative time determined in operation 901. The server may browse at least two representative times collected, and allow the user to select one of the representative times.

In operation 905, the server determines a tree map of the time corresponding to at least one of the representative times. According to an embodiment, the server may arbitrarily select one of the at least two representative times collected. The server may display the tree region image corresponding to the selected representative time, or transmit the tree region image to other device.

Figure 10:
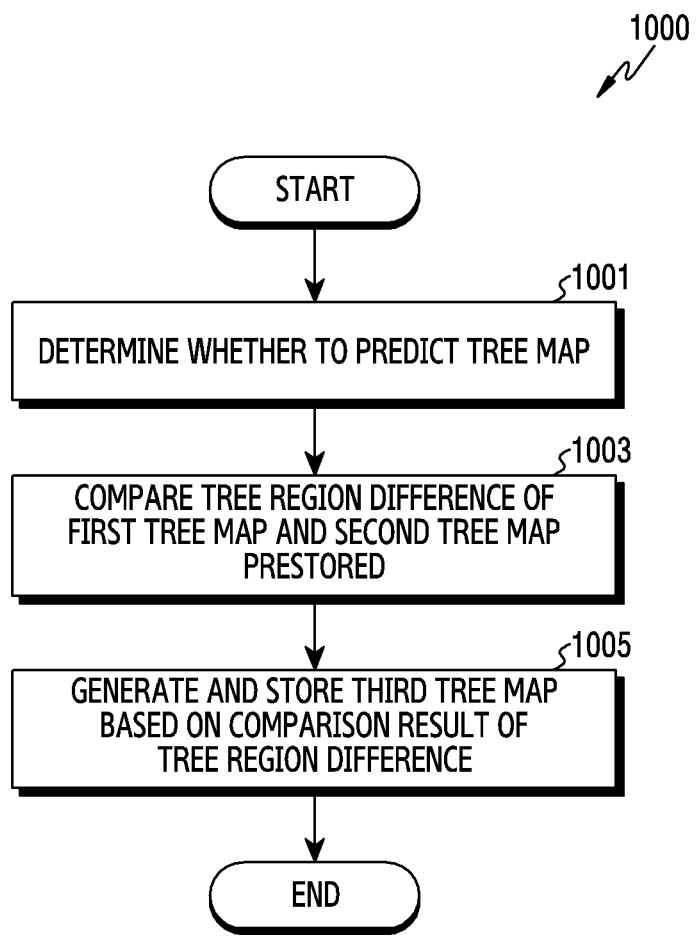
FIG. 10 illustrates a flowchart of a server for predicting a tree map in a system according to an embodiment of the disclosure.

FIG. 10 illustrates a flowchart of a server for predicting a tree map in a system according to an embodiment of the disclosure. FIG. 10 illustrates an operating method of the server 110.

Referring to FIG. 10, in a method 1000, in operation 1001, the server determines whether to predict a tree map. Whether to predict the tree map may be determined based on a user's criterion. According to an embodiment, if determining insufficient tree map information, the server determines to predict the tree map at an arbitrary time set by the user. According to an embodiment, the server may predict the tree map on a periodic basis which is set by the user.

In operation 1003, the server compares a tree region difference of a first tree map prestored and a second tree map prestored. The first tree map indicates the past tree map, and the second tree map indicates the tree map after the first tree map. The tree region difference indicates a difference of a region occupied by trees in the tree map. According to an embodiment, the tree region difference may indicate a color difference of the tree region in the tree map. The color data difference may digitize the color based on at least one of RGB, HSB or CMYK, and indicate the value indicative of its value change. According to another embodiment, the tree region difference may indicate an area data difference of the region occupied by the trees in the tree image. According to an embodiment, comparing a past tree area and a current tree area may include using the IOU.

In operation 1005, the server generates a third tree map based on the comparison result of the tree distribution difference. The third tree map indicates a tree map predicted after the second tree map. According to an embodiment, the third tree map may be determined to the tree map having the same difference as the tree region difference of the first tree map and the second tree map. The third tree map may be determined to the difference predicted by statistically comparing the changes of the tree region difference of the tree maps. According to an embodiment, the statistical difference may be determined based on the tree region difference in the grids except for a target grid. According to another embodiment, the statistical difference may be determined based on the tree region difference in other grid, if determining the same tree.

Figure 11:
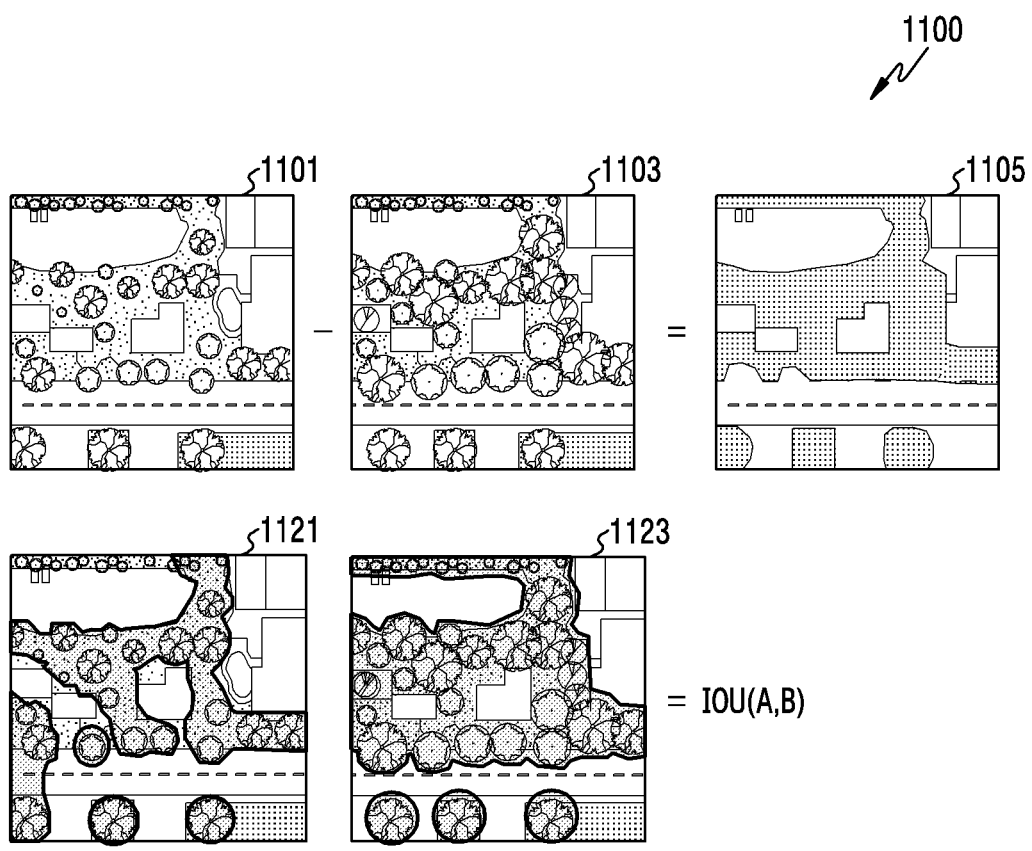
FIG. 11 illustrates tree region images of different times to determine whether to regenerate a tree map in a system according to an embodiment of the disclosure.

FIG. 11 illustrates tree region images at different times to determine whether to regenerate a tree map in a system according to an embodiment of the disclosure. FIG. 11 illustrates an example of the tree images for comparing a recent image stored in the database and a current image based on monitoring satellite images.

Referring to FIG. 11, in tree region images 1100, the upper left image is a current tree image 1101, the upper middle image is a past tree image 1103, and the upper right image is an image 1105 indicating color difference. The tree occupation region changes according to the growth of the tree with time and accordingly the current tree image 1101 and the past tree image 1103 may differ even at the same location. According to an embodiment, the current tree image 1101 and the past tree image 1103 may have different leaf colors according to the season. The leaves have the color of a lower brightness in the winter than the summer, and such a difference may indicate the color difference of the current tree image 1101 and the past tree image 1103. The server may calculate a color difference value of the trees in the current tree image 1101 and the past tree image 1103, and thus determine the image 1105 indicating the color difference. According to an embodiment, the color difference value may be digitized based at least one of the RGB, the HSB or the CMYK, and indicate the value indicating its value change.

Referring to FIG. 11, the lower left image is a current tree region image 1121, and the lower right image is a past tree region image 1123. The tree distribution differs based on time, and the current tree region image 1121 and the past tree region image 1123 may differ even at the same location. According to an embodiment, since the trees are less dense in the winter than the summer, the tree occupation region reduces on the image. The IOU result may be calculated by substituting the tree area of the current tree region image 1121 and the tree area of the past tree region image 1123. The IOU result may be determined by substituting the current tree region image 1121 and the past tree region image 1123 to A and B of IOU(A, B), and dividing the current and past tree region areas by the whole tree region area.

Whether to regenerate the tree map is determined according to whether the color difference value or the IOU value exceeds a threshold. The threshold may be arbitrarily set by the user, and the user may determine to regenerate the tree map if the color difference value or the IOU value exceeds or falls below the threshold.

Figure 12:
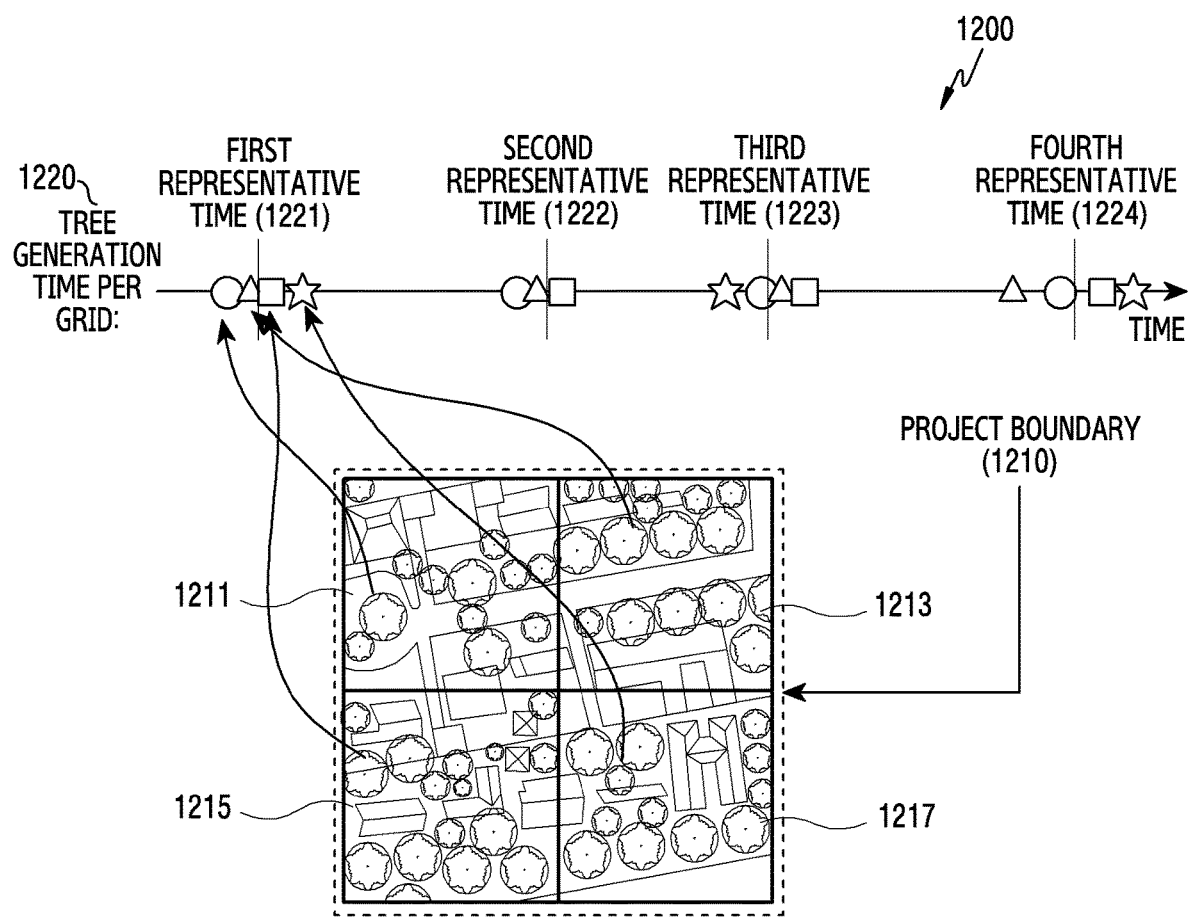
FIG. 12 illustrates a flowchart of a method for browsing a tree map according to vintage in a system according to an embodiment of the disclosure.

FIG. 12 illustrates a flowchart of a method for browsing a tree map according to vintage in a system according to an embodiment of the disclosure.

Referring to FIG. 12, in a method 1200, a project boundary 1210 may be divided into at least one grid. According to an embodiment of the disclosure, the project boundary may be divided into first through fourth grids 1211, 1213, 1215 and 1217, the example of FIG. 12 divides the project boundary 1210 into the four grids, and the number of the grids may be set arbitrarily. The top of FIG. 12 indicates a tree generation time 1220 per grid based on time. According to an embodiment, the tree generation time 1220 in the grids may be expressed in chronological order on the graph, which corresponds to a circle in the first gird 1211, a triangle in the second grid 1213, a square in the third grid 1215, and a star in the fourth grid 1217. The server determines representative times 1221 through 1224 by clustering the tree generation time in the grids. The tree generation time may indicate that tree map information observed in the image exceeds a threshold. The representative time, which is determined by clustering the tree generation times per grid, may be determined based on the tree generation time, or may be arbitrarily determined by the user. If the first through fourth representative times 1221 through 1224 are determined, the server browses the representative times to allow the user to select at least one of the first through fourth representative times 1221 through 1224. The server may display the tree map corresponding to the selected representative time, or may transmit tree map information corresponding to the representative time.

Figure 13:
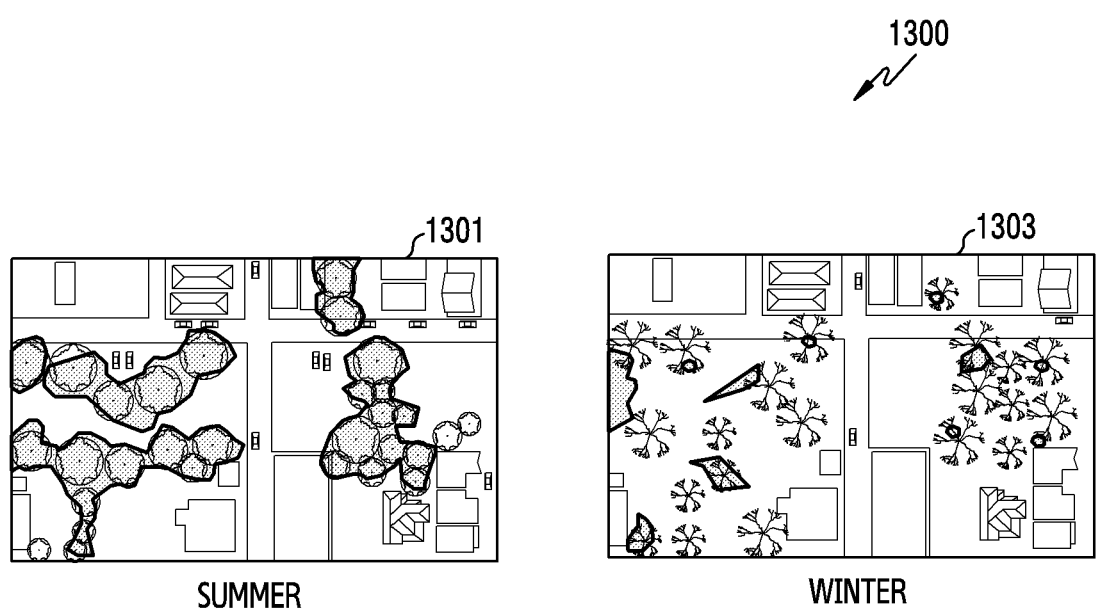
FIG. 13 illustrates tree map images based on a satellite image according to a season, in a system according to an embodiment of the disclosure.

FIG. 13 illustrates tree map images based on a satellite image according to a season, in a system according to an embodiment of the disclosure.

Referring to FIG. 13, in tree map images 1300, the left image is a summer tree map 1301, and the right image is a winter tree map 1303. A shaded portion in the summer tree map 1301 and the winter tree map 1303 indicates the tree occupation region, and the shaded portion of the summer tree map 1301 is greater than the shaded portion of the winter tree map 1303 in an embodiment of the disclosure. According to various embodiments of the disclosure, the summer and winter tree maps may be generated by monitoring satellite images.

Figure 14:
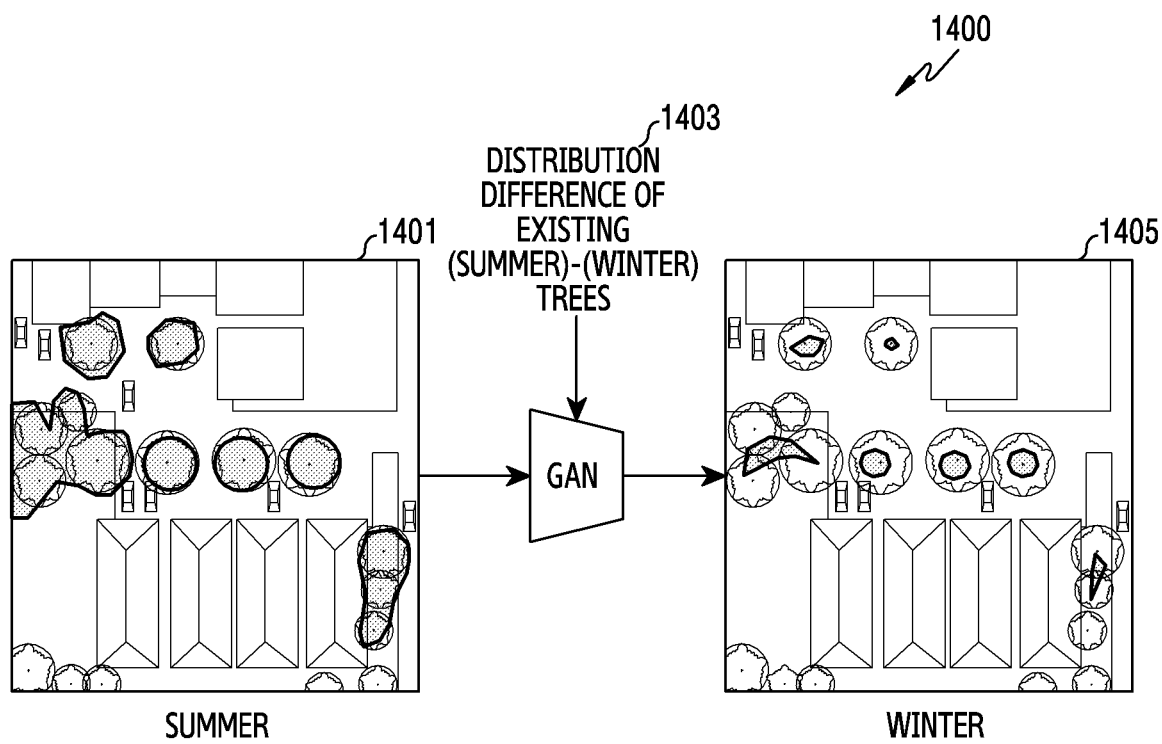
FIG. 14 illustrates images of generating a tree map based on a seasonal tree distribution of a perimeter, in a system according to an embodiment of the disclosure.

FIG. 14 illustrates images of generating a tree map based on a seasonal tree distribution of a perimeter, in a system according to an embodiment of the disclosure.

Referring to FIG. 14, in images 1400, the left image is a summer tree map 1401, a center image is a generative adversarial network (GAN) 1403, and the right image is a winter tree map 1405. Shaded portions in the summer tree map 1401 indicate the tree occupation regions, and shaded portions in the winter tree map 1405 indicate regions to be occupied by the trees.

The server 110 may predict the tree occupation portion in the tree map if images are deficient or the user sets. According to an embodiment of the disclosure, the server predicts the tree occupation portion in the winter tree map through a GAN 1403, based on the tree distribution difference of the summer and the winter. The GAN 1403 learns through competition of two models of a generator and a discriminator and produces a result. That is, the generator generates prediction data close to the real based on the summer and winter tree distribution difference, and the discriminator leans to discriminate the data generated by the generator. Through this learning, the server may predict the tree occupation region in the tree map.

Figure 15:
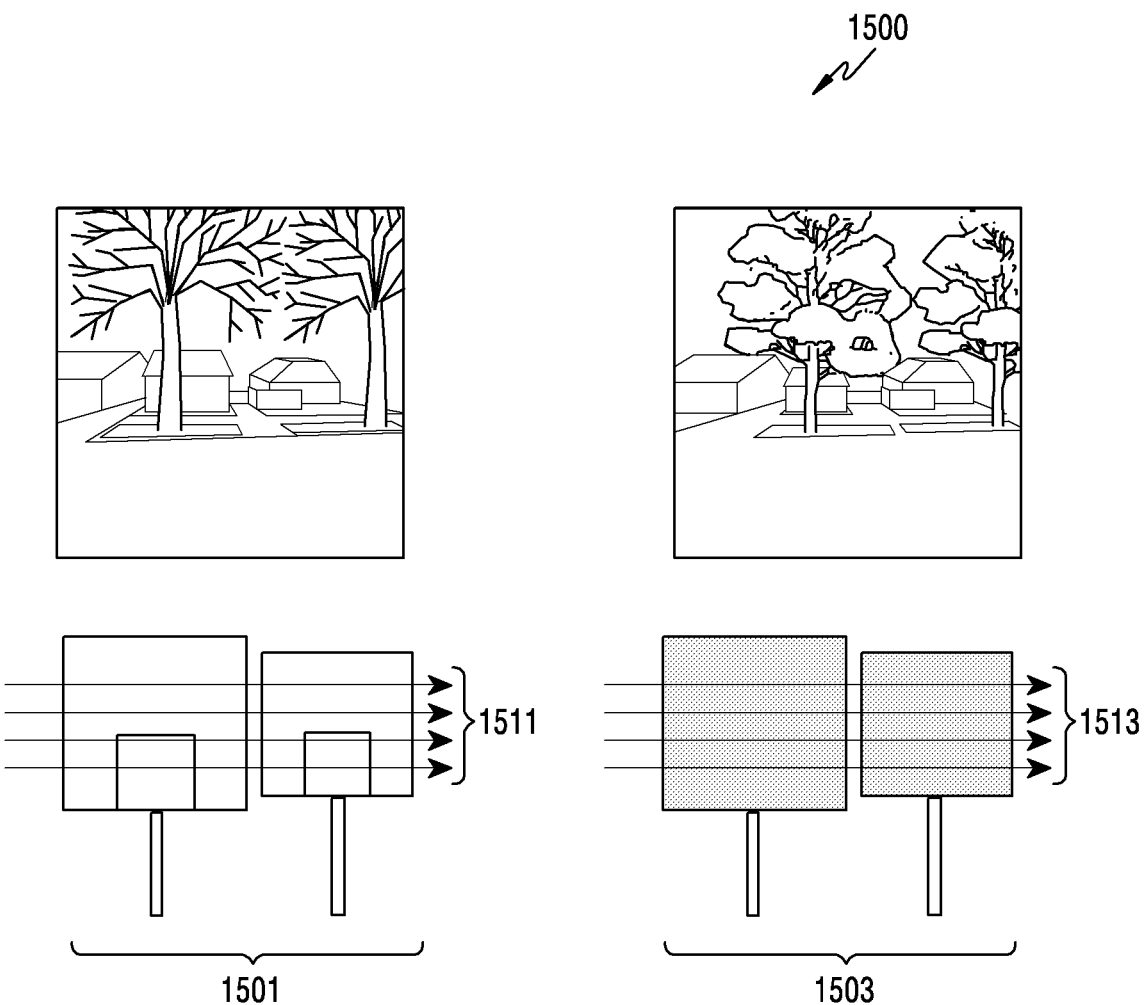
FIG. 15 illustrates images of an effect of trees on radio wave penetration according to a seasonal change, in a system according to an embodiment of the disclosure.

FIG. 15 illustrates images of an effect of trees on radio wave penetration according to a seasonal change, in a system according to an embodiment of the disclosure.

Referring to FIG. 15, in images 1500, the left shows trees 1501 with less leaves, and the right shows leafy trees 1503. According to an embodiment of the disclosure, due to the seasonal difference, the absolute amount or the size of the leaves changes. According to the change of the leaves, a signal may be diffracted or transmitted to cause a propagation receive gain. Signal transmission 1511 through the sparse trees has less penetration loss than signal transmission 1513 through the dense trees. The radio wave penetration is subject to the less loss because the leaves occupy less region in the sparse tree and the leaf density is low.

Figure 16:
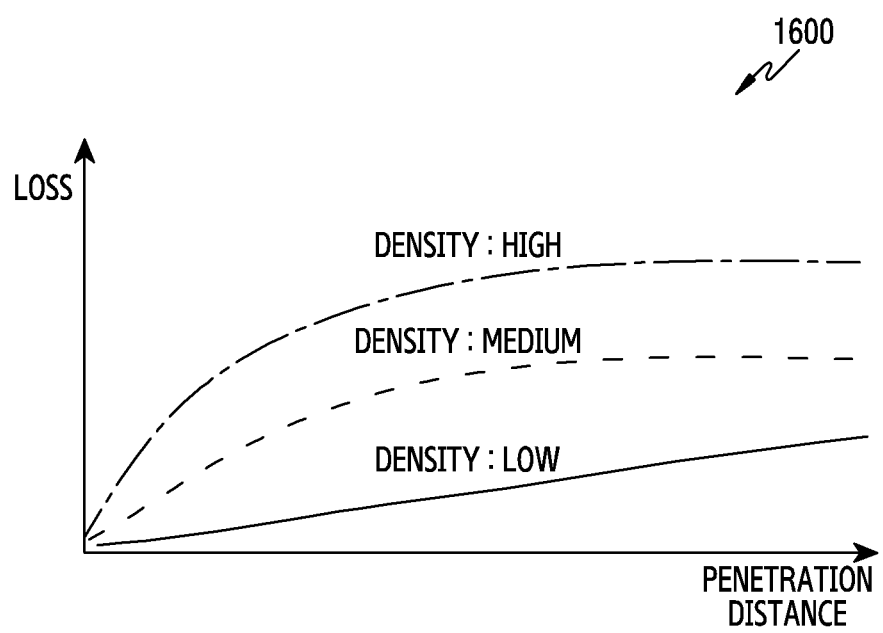
FIG. 16 illustrates a radio wave penetration loss graph based on density, in a system according to an embodiment of the disclosure.

FIG. 16 illustrates a radio penetration loss graph based on density, in a system according to an embodiment of the disclosure.

Referring to FIG. 16, a radio penetration loss graph 1600 shows the signal loss according to a penetration distance. In FIG. 16, the longer penetration distance, the greater penetration loss. At the same penetration distance, the loss increases as the density of the penetration target increases. According to an embodiment of the disclosure, since the total amount of the leaves in summer is greater than the total amount of the leaves in winter, the leaf density is considerable in summer Hence, the signal loss through the summer tree is greater than the signal loss through the winter tree.

Figure 17:
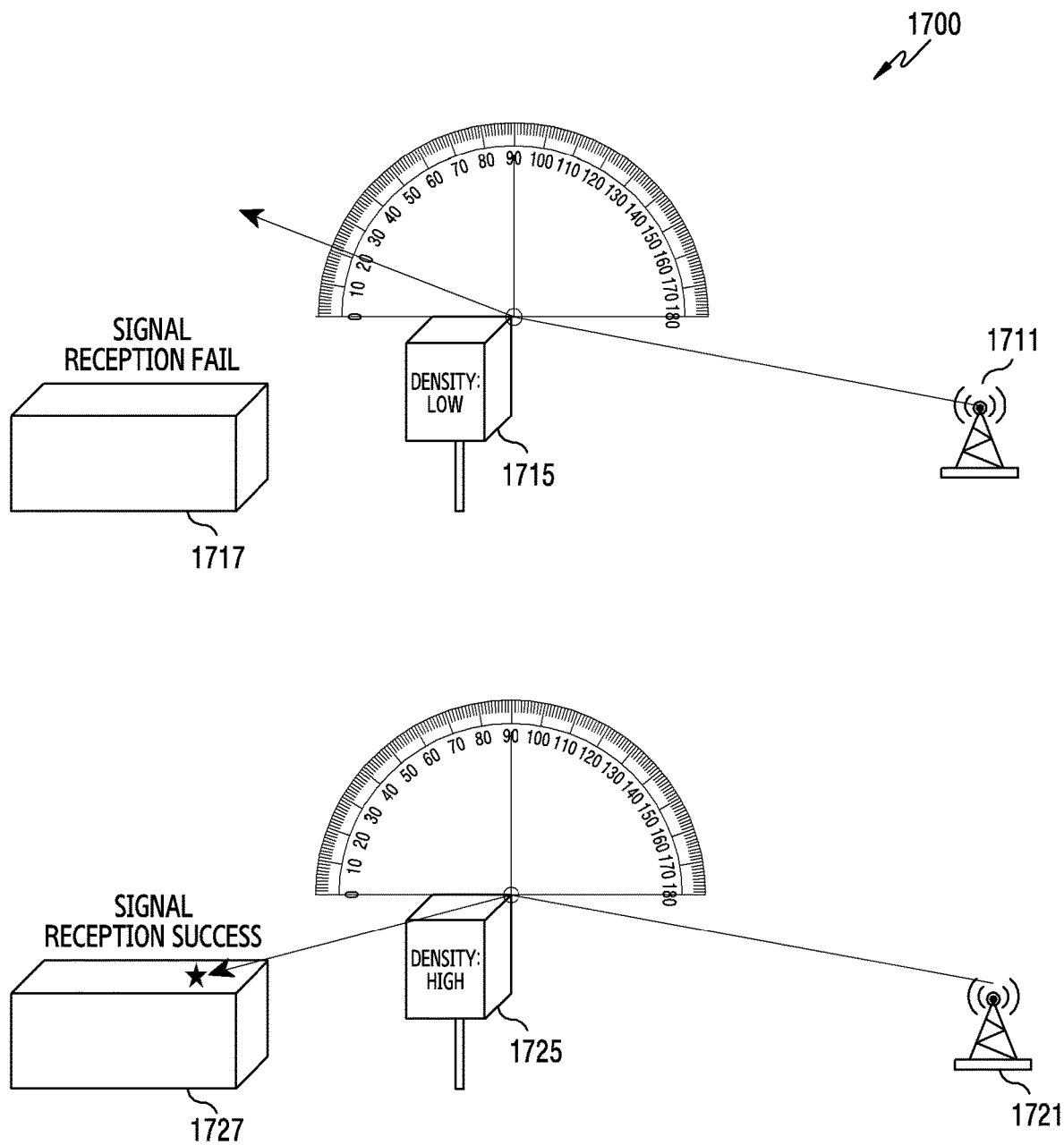
FIG. 17 illustrates a propagation which diffracts according to tree density, in a system according to an embodiment of the disclosure.

FIG. 17 illustrates a propagation which diffracts according to tree density, in a system according to an embodiment of the disclosure.

Referring to FIG. 17, in a propagation 1700, a BS 1711 and a BS 1721 transmit signals to a first receiving stage 1717 and a second receiving stage 1727 at the same angle respectively. A low-density tree 1715 is between the BS 1711 and the first receiving stage 1717, and a high-density tree 1725 is between the BS 1711 and the second receiving stage 1727. The signal transmitted by the BS 1711 is diffracted less at the low-density tree 1715 due to a small diffraction coefficient, and the first receiving stage 1717 fails the signal reception. The signal transmitted by the BS 1721 is diffracted considerably at the high-density tree 1725 due to a great diffraction coefficient, and the second receiving stage 1727 succeeds in the signal reception. According to an embodiment of the disclosure, since the total amount of the leaves in summer is greater than the total amount of the leaves in winter, the leaf density is high in summer. The leaf density differs according to the season, the signal diffraction varies, and whether the receiving stage successfully receives the signal may depend on the diffraction difference.

Figure 18:
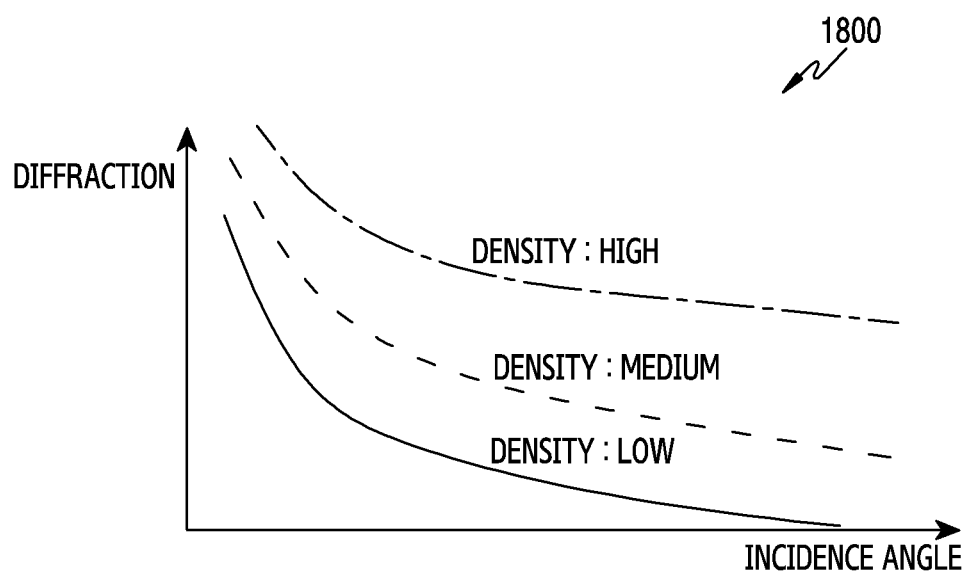
FIG. 18 illustrates a diffraction change graph according to density in a system according to an embodiment of the disclosure.

FIG. 18 illustrates a diffraction change graph according to density in a system according to an embodiment of the disclosure.

Referring to FIG. 18, a diffraction change graph 1800 shows the diffraction based on an incidence angel. Referring to FIG. 18, the greater incidence angel the less diffraction. At the same incidence angle, the diffraction increases as the density of a diffracting target increases. According to an embodiment of the disclosure, since the total amount of the leaves in summer is greater than the total amount of the leaves in winter, the leaf density is considerable in summer Hence, the signal diffraction through the summer tree is greater than the signal diffraction through the winter tree.

Figure 19:
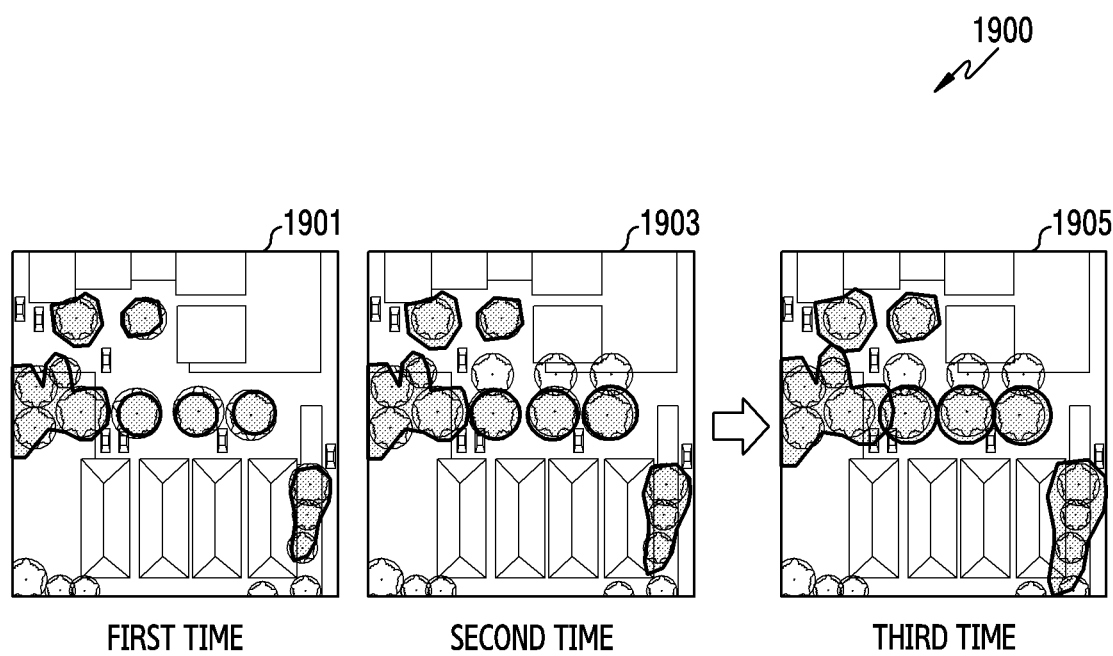
FIG. 19 illustrates future tree map prediction using a satellite image in a system according to an embodiment of the disclosure.

FIG. 19 illustrates a future tree map prediction using a satellite image in a system according to an embodiment of the disclosure.

Referring to FIG. 19, a future tree map prediction 1900 includes a satellite image 1901 measured at a first time, a satellite image 1903 measured at a second time, and a satellite image 1905 measured at a third time. The first time and the second time precede the present time, and the first time precedes the second time. The third time indicates a future time. The server may store a tree map of the satellite image 1901 measured at the first time, and a tree map of the satellite image 1903 measured at the second time. The server may predict a tree region of the satellite image 1905 measured at the third time, based on tree regions of the satellite image 1901 measured at the first time and the satellite image 1903 measured at the second time. According to an embodiment of the disclosure, the satellite image 1905 measured at the third time may be determined based on a tree region difference in the satellite images 1901 and 1903 measured at the first time and the second time. According to an embodiment of the disclosure, the tree region of the satellite image 1905 measured at the third time may be determined according to statistics of tree region data periodically generated.

Figure 20:
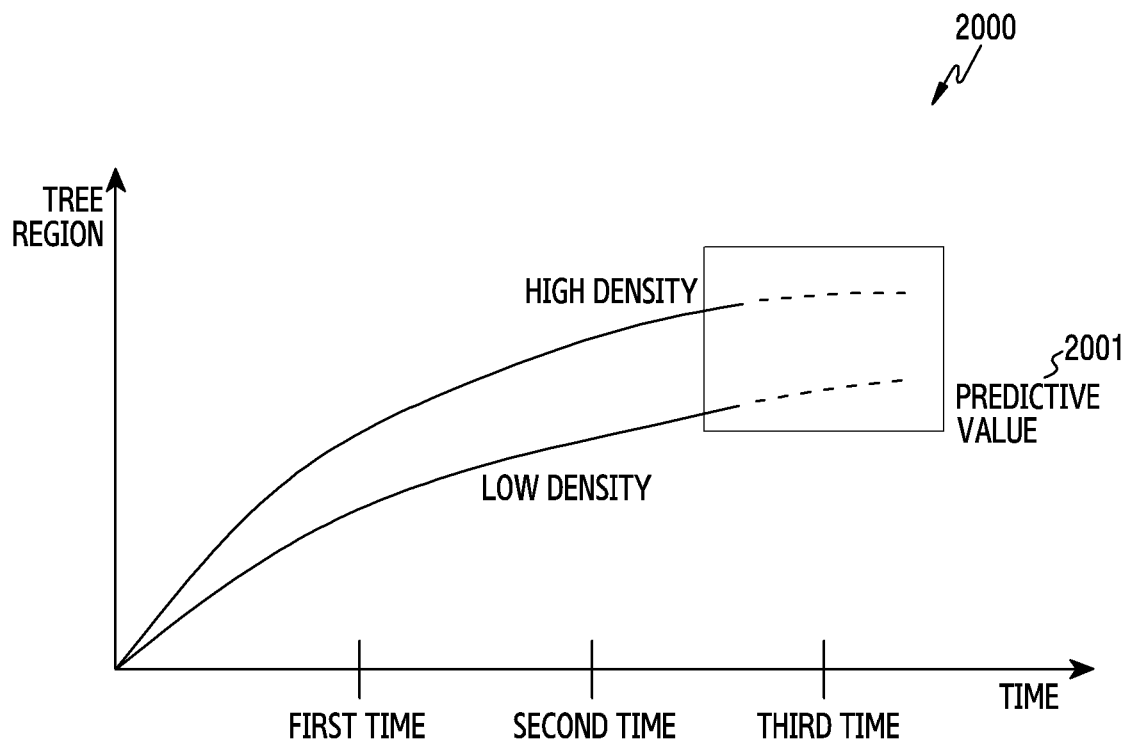
FIG. 20 illustrates a graph for predicting a future tree map in a system according to an embodiment of the disclosure.

FIG. 20 illustrates a graph for predicting a future tree map in a system according to an embodiment of the disclosure.

Referring to FIG. 20, a graph 2000 shows tree region changes based on time. According to an embodiment of the disclosure, as the time passes, the tree occupation region increases in the satellite images. In the same time period, the tree occupation region in the satellite image increases as the density of the signal penetration target increases. According to an embodiment of FIG. 20, the first time and the second time indicate past times, and the server may measure and store the tree region on a periodic basis including the first time and the second time. Based on the tree region stored per time, the server may determine a predictive value 2001 of the tree occupation region at the third time. The predictive value 2001 may be determined statistically based on at least one of the change or the tree region difference of the first time and the second time.

Figure 21:
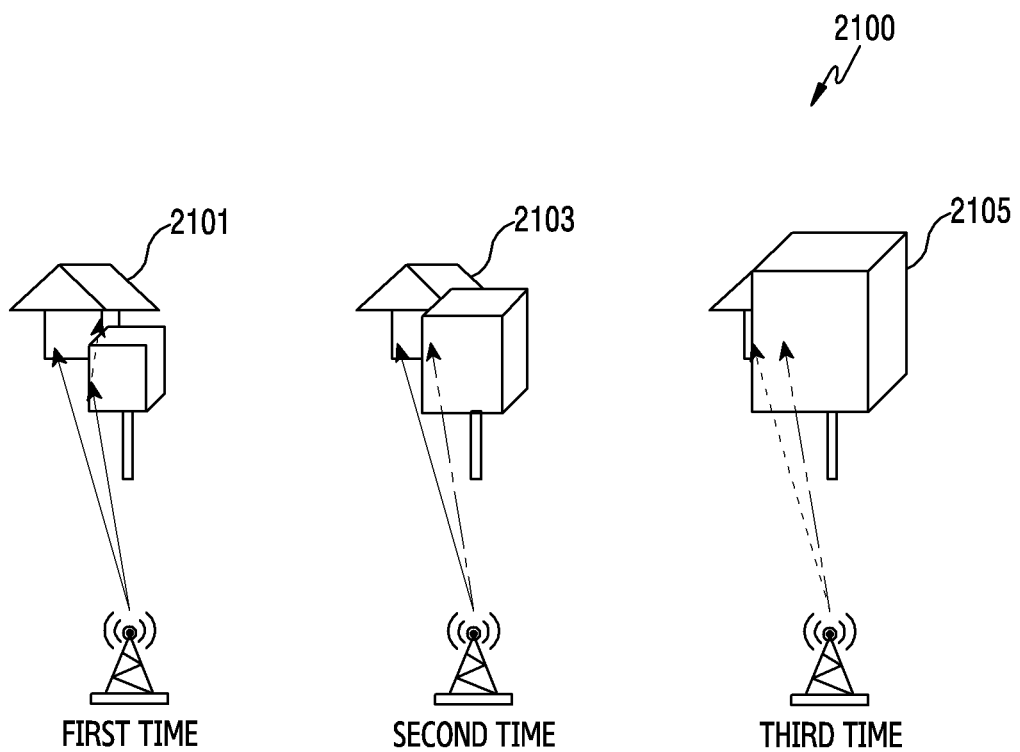
FIG. 21 illustrates images of a propagation element which changes according to tree growth in a system according to an embodiment of the disclosure.

FIG. 21 illustrates images of a propagation element which changes according to tree growth in a system according to an embodiment of the disclosure.

Referring to FIG. 21, images 2100 depict signal propagation 2101 at a first time, signal propagation 2103 at a second time, and signal propagation 2105 at a third time. In the signal propagation 2101 at the first time, a received signal strength is high at the receiving stage due to a small tree size. In the signal propagation 2103 at the second time, the received signal strength is low at the receiving stage due to the tree growth. In the signal propagation 2105 at the third time, the tree thoroughly interferes with the received signals and the receiving stage fails the signal reception. As the time passes, the tree grows in width or in height, and leaf edges affect the signal diffraction and penetration. Hence, if the receiving stage is fixed, its signal quality of an absolute value is not guaranteed as the time passes.

According to various embodiments of the disclosure, the server may analyze the satellite image, model the tree shape, and predict the tree region, but the tree map regeneration may be divided into a satellite image analyzer, a tree shape modeler, a predictor, a database, a propagation simulator, and so on.

According to the embodiments described above, the map for the tree is regenerated or predicted. However, the tree may include an object which periodically changes in shape based on time, and the aforementioned various embodiments may be applied thereto.

In addition, an apparatus and a method according to various embodiments of the disclosure may acquire a more accurate propagation environment, by managing and analyzing a tree map.

According to an embodiment, a method for operating a server, the method comprising: receiving a first image comprising at least one tree, determining whether to generate a tree map based on the first image, based on a difference between first tree region data of the first image and second tree region data of a second image which is prestored and generating the tree map according to the determining.

In some embodiments, wherein the receiving of the first image comprises: segmenting a prestored tree region image into at least one grid, determining one of the at least one segmented grid to a representative location and receiving a tree region image of a location corresponding to the determined representative location.

In some embodiments, further comprising: determining a first representative time by clustering tree generation times in the at least one grid, browsing a prestored second representative time in the at least one grid, determining a tree map of a time corresponding to at least one of the first representative time and the prestored second representative time and transmitting the determined tree map.

In some embodiments, wherein the determining of whether to generate the tree map comprises: determining the difference of the first tree region data and the second tree region data and determining whether the difference exceeds a threshold, and wherein the first tree region data and the second tree region data comprise color data of a region occupied by a tree in an image.

In some embodiments, wherein the color data of the region occupied by the tree is determined based on at least one of red green blue (RGB), hue saturation brightness (HSB) or cyan magenta yellow and black key (CMYK).

In some embodiments, wherein the determining of whether to generate the tree map comprises: determining the difference of the first tree region data and the second tree region data and determining to regenerate the tree map in response to the difference is greater than or equal to a threshold, and wherein the first tree region data and the second tree region data comprise area data of a region occupied by a tree in an image.

In some embodiments, wherein the determining of the difference of the first tree region data and the second tree region data comprises: determining an intersection over union (IOU) of the first tree region data and the second tree region data.

According to an embodiment, A method for operating a server, comprising: determining whether to predict a tree map and generating the tree map based on first tree region data of a first image prestored, and second tree region data of a second image prestored.

In some embodiments, wherein the first tree region data and the second tree region data comprise area data of a region occupied by a tree in the first image.

In some embodiments, wherein the first tree region data and the second tree region data comprise color data of a region occupied by a tree in an image, and wherein the color data of the region occupied by the tree is determined based on at least one of red green blue (RGB), hue saturation brightness (HSB) or cyan magenta yellow and black key (CMYK).

In some embodiments, wherein the generating of the tree map comprises: determining a first difference related to a tree region in the first tree region data and the second tree region data determining a third difference predicted by statistically comparing the difference with a second difference prestored and generating the tree map to correspond to the determined third difference.

According to an embodiment, a server comprising: a transceiver and at least one processor functionally coupled to the transceiver, wherein the at least one processor is configured to: receive a first image comprising at least one tree, determine whether to generate a tree map based on the first image, based on a difference between first tree region data of the first image and second tree region data of a second image which is prestored, and generate the tree map according to the determining.

In some embodiments, wherein the at least one processor is further configured to: segment a prestored tree region image into at least one grid, determine one of the at least one segmented grid to a representative location, and receive a tree region image of a location corresponding to the determined representative location.

In some embodiments, wherein the at least one processor is further configured to: determine a first representative time by clustering tree generation times in the at least one grid, browse a prestored second representative time in the at least one grid, determine a tree map of a time corresponding to at least one of the first representative time and the prestored second representative time, and transmit the determined tree map.

In some embodiments, wherein the at least one processor is further configured to: determine the difference of the first tree region data and the second tree region data, and determine whether the difference exceeds a threshold, and wherein the first tree region data and the second tree region data comprise color data of a region occupied by a tree in an image.

In some embodiments, wherein the color data of the region occupied by the tree is determined based on at least one of red green blue (RGB), hue saturation brightness (HSB) or cyan magenta yellow and black key (CMYK).

In some embodiments, wherein the at least one processor is further to: determine the difference of the first tree region data and the second tree region data, and determine to regenerate the tree map in response to the difference is greater than or equal a threshold, and wherein the first tree region data and the second tree region data comprise area data of a region occupied by a tree in an image.

In some embodiments, wherein the at least one processor is further configured to: determine an intersection over union (IOU) of the first tree region data and the second tree region data.

According to an embodiment, a server comprising: a transceiver and at least one processor functionally coupled to the transceiver, wherein the at least one processor is configured to: determine whether to predict a tree map, and generate the tree map based on first tree region data of a first image prestored, and second tree region data of a second image prestored.

In some embodiments, wherein the first tree region data and the second tree region data comprise area data of a region occupied by a tree in an image.

In some embodiments, wherein the first tree region data and the second tree region data comprise color data of a region occupied by a tree in an image, and wherein the color data of the region occupied by the tree is determined based on at least one of red green blue (RGB), hue saturation brightness (HSB) or cyan magenta yellow and black key (CMYK).

In some embodiments, wherein the at least one processor is further configured to: determine a first difference related to a tree region in the first tree region data and the second tree region data, determine a third difference predicted by statistically comparing the difference with a second difference pre stored, and generate the tree map to correspond to the determined third difference.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored to a memory combining part or all of those recording media. A plurality of memories may be equipped.

In addition, the program may be stored in an attachable storage device accessible via a communication network such as Internet, Intranet, local area network (LAN), wide LAN (WLAN), or storage area network (SAN), or a communication network by combining these networks. The storage device may access the electronic device through an external port. A separate storage device may access the device over the communication network.

In the specific embodiments of the disclosure, the elements included in the disclosure are expressed in a singular or plural form. However, the singular or plural expression is appropriately selected according to a proposed situation for the convenience of explanation and the disclosure is not limited to a single element or a plurality of elements. The elements expressed in the plural form may be configured as a single element, and the elements expressed in the singular form may be configured as a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a server, the method comprising:
    segmenting a prestored tree region image into a plurality of grids;
    determining a first representative time by clustering tree generation times in the plurality of grids;
    browsing the first representative time and a second representative time in the plurality of grids, wherein the second representative time is prestored;
    determining a grid of the plurality of grids to a representative location and a time corresponding to one of the first representative time and the second representative time;
    receiving a first image comprising at least one tree based on a location of the grid and the time;
    determining whether to generate a tree map based on a difference between a first tree region data of the first image and a second tree region data of a second image which is prestored;
    generating the tree map according to the determining of whether to generate; and
    transmitting the tree map,
    wherein the plurality of grids are segments of the prestored tree region image.

2. The method of claim 1,
    wherein the determining of whether to generate the tree map comprises:
    determining the difference of the first tree region data and the second tree region data; and
    determining whether the difference exceeds a threshold, and
    wherein the first tree region data and the second tree region data comprise color data of a region occupied by a tree in an image.

3. The method of claim 2, wherein the color data of the region occupied by the tree is determined based on at least one of red green blue (RGB), hue saturation brightness (HSB) or cyan magenta yellow and black key (CMYK).

4. The method of claim 1,
    wherein the determining of whether to generate the tree map comprises:
    determining the difference of the first tree region data and the second tree region data; and
    determining to regenerate the tree map in response to the difference is greater than or equal to a threshold, and
    wherein the first tree region data and the second tree region data comprise area data of a region occupied by a tree in an image.

5. The method of claim 4, wherein the determining of the difference of the first tree region data and the second tree region data comprises:
    determining an intersection over union (IOU) of the first tree region data and the second tree region data.

6. The method of claim 1,
    wherein the time corresponding to one of the first representative time and the second representative time is determined based on a selection by a user, and
    wherein the grid is preconfigured by the user.

7. The method of claim 1, further comprising:
    performing an update according to the tree map; and
    storing the tree map,
    wherein the tree map is stored by a vintage.

8. A server comprising:
    a transceiver; and
    at least one processor operably coupled to the transceiver,
    wherein the at least one processor is configured to:
    segment a prestored tree region image into a plurality of grids,
    determine a first representative time by clustering tree generation times in the plurality of grids,
    browse the first representative time and a second representative time in the plurality of grids, wherein the second representative time is prestored,
    determine a grid of the plurality of grids to a representative location and a time corresponding to one of the first representative time and the second representative time,
    receive a first image comprising at least one tree based on a location of the grid and the time,
    determine whether to generate a tree map based on a difference between a first tree region data of the first image and a second tree region data of a second image which is prestored,
    generate the tree map according to the determining of whether to generate, and
    transmit the tree map,
    wherein the plurality of grids are segments of the prestored tree region image.

9. The server of claim 8,
    wherein the at least one processor is further configured to:
    determine the difference of the first tree region data and the second tree region data, and
    determine whether the difference exceeds a threshold, and
    wherein the first tree region data and the second tree region data comprise color data of a region occupied by a tree in an image.

10. The server of claim 9, wherein the color data of the region occupied by the tree is determined based on at least one of red green blue (RGB), hue saturation brightness (HSB) or cyan magenta yellow and black key (CMYK).

11. The server of claim 8,
    wherein the at least one processor is further to:
    determine the difference of the first tree region data and the second tree region data, and
    determine to regenerate the tree map in response to the difference is greater than or equal a threshold, and
    wherein the first tree region data and the second tree region data comprise area data of a region occupied by a tree in an image.

12. The server of claim 11, wherein the at least one processor is further configured to:

determine an intersection over union (IOU) of the first tree region data and the second tree region data.

* * * * *